W. C. HICKS.
Breech-Loading Fire-Arm.
No. 41,814. Patented Mar. 1, 1864.
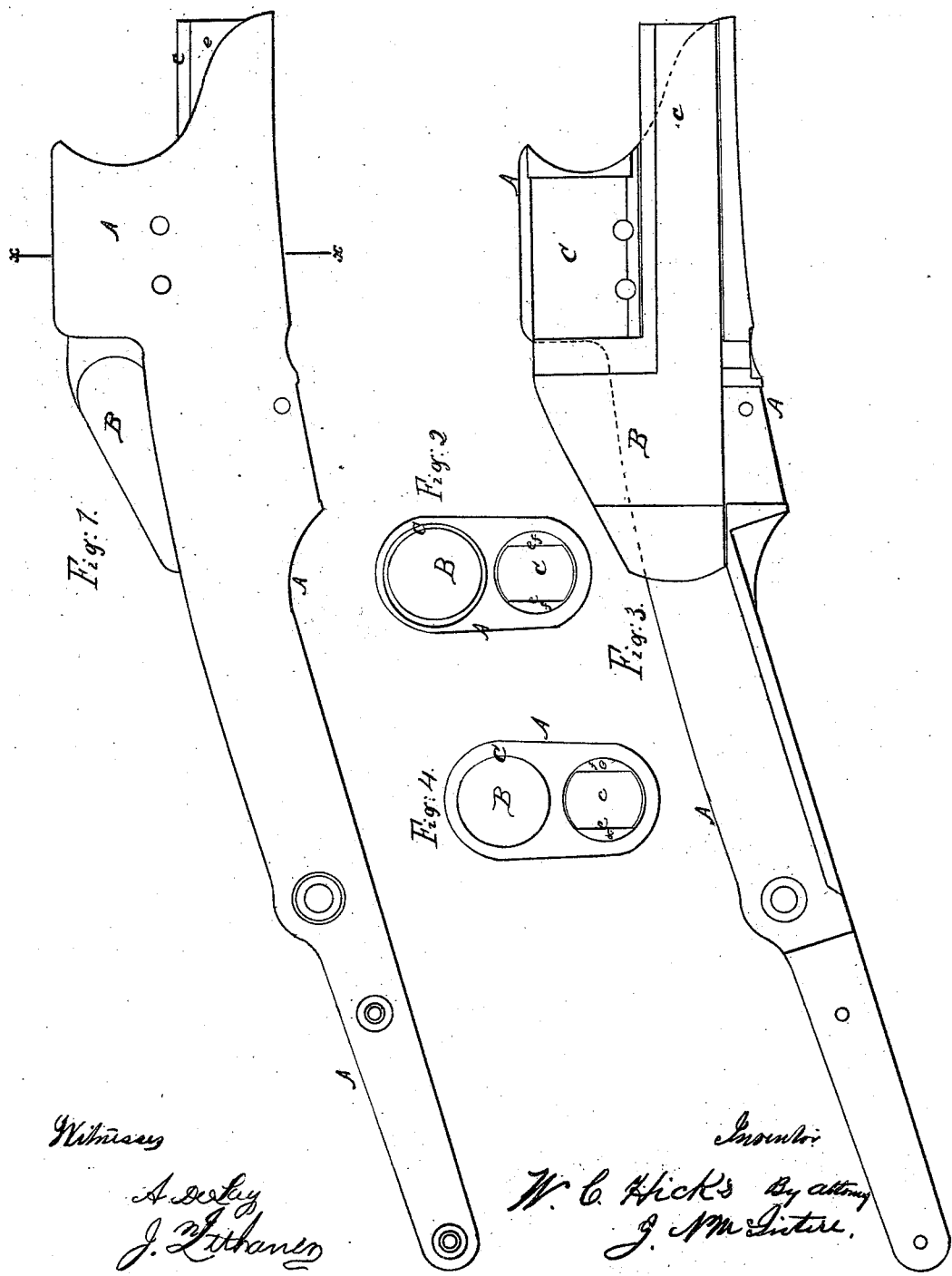

UNITED STATES PATENT OFFICE.

WILLIAM C. HICKS, OF NEW YORK, N. Y., ASSIGNOR TO EDWARD ROBINSON AND E. CHAMBERLIN, OF SAME PLACE.

IMPROVEMENT IN BREECH-LOADING FIRE-ARMS.

Specification forming part of Letters Patent No. 41,814, dated March 1, 1864.

*To all whom it may concern:*

Be it known that I, WILLIAM C. HICKS, of New York city, in the State of New York, have invented certain new and useful Improvements in Fire-Arms; and I do hereby declare that the following is a full and exact descripion thereof, reference being had to the accompanying drawings, making part of this application.

My invention relates to certain improvements on the breech-loading fire-arm shown and described in Letters Patent granted to C. C. Brand, April 28, 1863, and has for its object to overcome certain serious objections which I have found to exist in said patented fire-arm, and to render it capable of being more readily and economically manufactured and make it more successful and desirable practically for general use; and to these ends my invention consists in making the hole or space (in the frame) through which the shank or guide-bar of the sliding breech-piece works perfectly cylindrical, and adapting the said shank or guide-bar to a hole or space so shaped, whereby I am enabled to much more successfully and economically manufacture this kind of fire-arm, as will be fully described hereinafter; and my invention further consists in slabbing off or cutting away a portion on each side of the shank or extended part of the sliding breech-piece in such manner as to leave a vacant recess or chamber in the space or seat in which said said shank or extended portion works on either side of the latter, as and for the purpose hereinafter set forth.

To enable those skilled in the art to fully comprehend my said improvements, I will proceed to describe their construction and operation, referring by letters to the accompanying drawings, where I have represented only a sufficient portion of one of Brand's guns to illustrate clearly my improvements thereon.

Figure 1 is a side elevation of the frame and sliding breech-piece of a Brand gun with my invention added. Fig. 2 is an end view of the same. Fig. 3 is a longitudinal central section of the same; and Fig. 4 is a vertical cross-section of the same at the line $x$ $x$, Fig. 1.

In the several figures the same parts will be found designated by the same letter of reference.

A is the frame of the rifle or gun, and B the sliding breech-piece. C is the chamber into which the rear or breech end of the barrel is inserted, and directly under this chamber or bore in the frame A is formed the bore or hole in which the shank or extended portion $c$ of the breech-piece B slides or works. This bore or shank bearing, it will be observed, (see Figs. 2 and 4,) is perfectly round (in cross-section) or cylindrical, and the shank $c$ of the breech-piece, it will be seen, is cut away on either side at $e$ $e$, so as to leave vacant spaces or recesses $f$ $f$ between the said shank $c$ and its chamber or receiver in the frame A, as clearly seen at Fig. 4. In other respects the frame A and breech-piece B are similar to such parts of a Brand gun; but in the latter the shank $c$ and its bore or receiver in the frame A are made square or rectangular and the said shank completely fills the square space or hole (in the frame) in which it slides. The main object of and advantages gained by making the bore or hole in which the shank $c$ slides round and cutting away the sides of the shank $c$ in the manner described are to dispense with the operations in the manufacture of forming the square shank and square receiver, (or hole through the frame,) which are exceedingly difficult and expensive, when performed successfully, to afford receptacles $f$ $f$ for the collection of particles of dirt which may collect on the shank $c$, (which might otherwise clog its motions,) and in the production of the arm at a less cost and in a condition or form more desirable and conducive to a more successful working of the gun.

The breech-piece B (including its shank $c$) is slotted or cut out for the accommodation of portions of the lock-work, as shown by the more darkly tinted portions, and similar to the breech-piece of the Brand patent gun before referred to.

I am aware that a gun very similar to this has been made, in which the sliding breech-piece was formed or provided with a round shank or sort of base-pin, which worked in a round hole bored in the frame—as, for instance, as in the patent granted to C. C. Brand on the 29th day of July, 1862; but in such a gun the round shank was simply a pin, and did not contain any portion of the lock-work; and I do not wish my improvement to be confounded with a gun so constructed, neither do I wish to be understood as laying any claim to any particular construction of a pin or guide-rod to the sliding breech when such guide-rod is not hollowed out to contain portions of the lock-work and is not made to perform the functions of the shank $c$, as shown and described, and as employed in the Brand gun patented subsequently to that of July 29, 1862.

Having fully explained my invention, so that those skilled may make and use it, what I claim as new, and desire to secure by Letters Patent, is—

Cutting away the shank $c$ at $e$ $e$, as described, so as to leave the dirt-receptacles $f$ $f$ in its hole or receiver, (in the frame,) substantially as set forth.

In testimony whereof I have hereunto set my my hand and seal this 12th day of September, 1863.

WM. CLEVELAND HICKS. [L. S.]

Witnesses:
GEORGE W. SEAMAN,
W. H. HICKS.